333-128 SR
2/4/86 OR H 000,027

United States Statutory Invention Registration [19]

[11] Reg. Number: H27
[45] Published: Feb. 4, 1986

Mosko

[54] INTEGRABLE BROADSIDE POWER DIVIDER

[75] Inventor: Joseph A. Mosko, Ridgecrest, Calif.

[73] Assignee: The United States of America as represented by the Secretary of the Navy, Washington, D.C.

[21] Appl. No.: 773,475

[22] Filed: Sep. 3, 1985

[51] Int. Cl.[4] ..... H01P 3/08
[52] U.S. Cl. ..... 333/128; 333/238

[56] References Cited

U.S. PATENT DOCUMENTS 3,886,498 5/1975 Mosko et al. ..... 333/9

*Primary Examiner*—S. C. Buczinski
*Assistant Examiner*—Linda J. Wallace
*Attorney, Agent, or Firm*—Robert F. Beers; W. Thom Skeer; W. D. English

[57] ABSTRACT

A stripline printed circuit power divider is disclosed disposed on opposite sides of a central dielectric substrate in a three substrate layered stripline orientation. An electrically coupled, coplanar, dual lead of the power divider disposed on opposite sides of the central dielectric substrate is joined into a single lead on one side of the substrate by diverting each coplanar lead and passing one lead through a hole in the dielectric to be joined with the other lead on a single surface of the dielectric.

2 Claims, 7 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 2
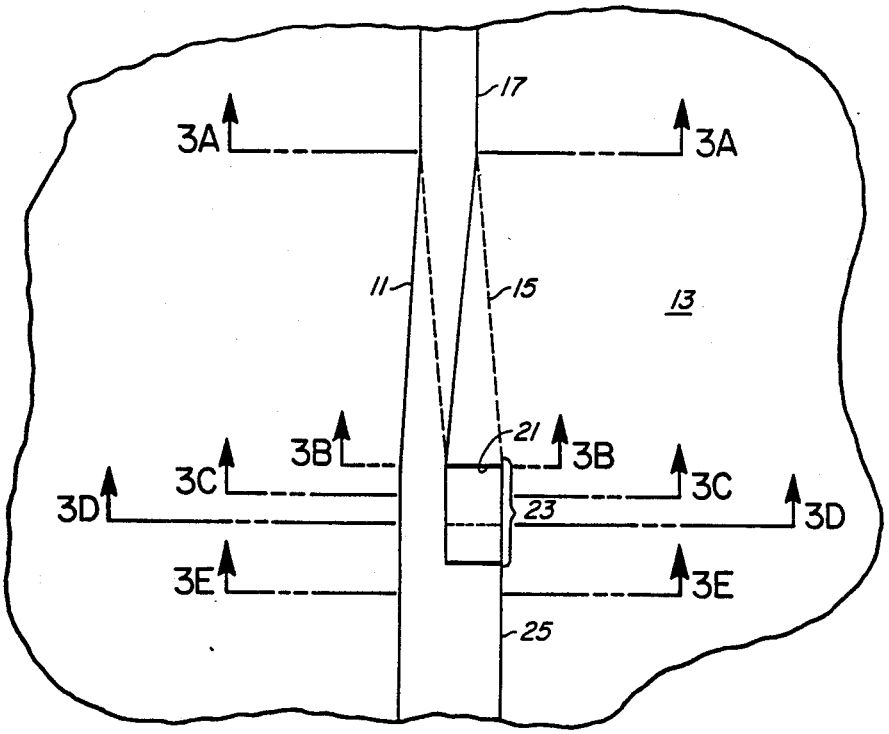
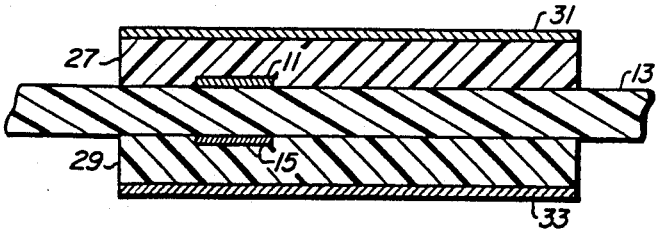
Fig. 3A

INTEGRABLE BROADSIDE POWER DIVIDER

BACKGROUND OF THE INVENTION

1. Field of the Invention

The invention relates to the field of electrical/electronic arts. More particularly the invention lies in the area of microwave power divider, printed circuit technology. More specifically, the invention discloses a method to efficiently combine two conductor strips of a power divider/combiner on opposite sides of a dielectric substrate in a three substrate layer, i.e. in a stripline device, into a single conductor strip on one side of the dielectric substrate.

2. Description of the Prior Art

Power dividers and combiners have a countless number of applications in various microwave systems and comprise narrow band, wide band, stepped impedance, tapered line, coaxial line, and stripline three port power dividers. Unfortunately, none of these prior art designs have been realizable in stripline with the following characteristics:

1. Reproducibility at low cost;
2. Power balance or tracking at the outputs better than 0.1 dB over frequency range;
3. Negligible insertion loss over what is due to that length of stripline;
4. Directivity of device decibel minimum, i.e. directivity being defined as the difference between the output port isolation and the insertion loss of the device; and
5. Minimum length of the power divider for a given degree of match at each of the three terminals.

Typical power divider isolation requirements basically rule out from consideration any heretofore known design employing stepped impedance lines or discrete loading between the two coupled lines. Also ruled out is any design that does not consider the two lines of the device to be coupled lines; i.e. coupling exists due to the required close proximity of the two lines leading to the power divider.

The minimum length, i.e. the minimum total insertion loss, requirement of a power divider of the type disclosed herein for a given degree of match dictates that the transformer be a Chebyshev type, not simply a linear or other type of taper.

Coplanar, stripline, Chebyshev-tapered, power dividers have been designed that perform quite well. In one such design, the slot between the coupled lines, which contains a lossy film attenuator, varied non-linearly with the link because a constant odd mode impedance of 50 ohms was used; however, to cut and shape the lossy material and insert it into the slot without getting significant attenuation of the even mode was extremely difficult to accomplish from a practical standpoint. The slightest overlap of the lossy film with the stripline induced several decibels of loss for the even mode. Such a power loss makes accurate tracking or power balance virtually impossible to achieve due to the critical alignment of the lossy film material with the stripline conductors.

Another power divider was designed similar to the above-described technique except that the odd mode impedance was chosen so that the slot between the coupled lines became a triangular wedge, facilitating accurate cutting of the lossy film material. This allowed considerably simpler alignment of the lossy film with the stripline conductors without excessive overlap. Unfortunately, it was still very difficult to insert the lossy film in such a way that the insertion loss was low while yielding good balance and high isolation.

Based on the assumption that a film between two coplanar strips was too critical for placement, a subsequent design involved a broadside coupled stripline power divider. The constraint on the mode for a Chebyshev-tapered device was that the unloaded impedance be 50 ohms as in conventional quadrature couplers. Therefore, the odd mode impedance was reduced below the theoretical value in the loaded region, thus slightly degrading the match as seen from the output terminals. Holes were drilled and resistively loaded with dielectric spacers separating the offset parallel coupled striplines while keeping the loading material reasonably well-confined between the coupled conductors. Again, however, it was very, very difficult to attain good power division and isolation with low insertion loss in this type device in part because the conductor edges of the coupled line were severed by the drill when loading the dielectric spacer and later could not be sufficiently well repaired. However, power handling capability of the broadside coupled line configuration proved superior to the earlier coplanar etched coupled configuration.

A subsequent design, disclosed in U.S. Pat. No. 3,886,498 by Mosko and Corzine, provided a broadside power divider with loading only in the completely overlapping region of the conductor strips. As before, the even mode impedance of the coupled stripline was selected to taper from 100 to 50 ohms for a 50 ohm input impedance at all three terminals as a Chebyshev transformer. Over a suitable part of the total length of the device the odd mode impedance was required to be sufficiently low so that the coupled lines were exactly overlapped, where the s/b ratio was previously selected for compatibility with other stripline components etched on the same stripline sandwich and interconnected with the power divider; "b" conventionally being the total thickness of a three layer dielectric sandwich and "s" being the central dielectric thickness. This allowed loading between the coupled lines, through the s layer (s-spacer) with suitable load material in order to absorb/attenuate the odd mode and refilling the conductor strip holes with similar conductive material. This could be easily accomplished since any drilling, milling, etc., could be done without severing the outside edges of the coupled lines. In addition, the even mode electric field lines are nonexistent between the coupled strips, thereby guaranteeing least loss for the even mode. Thus, a highly symmetrical and effective lossy transmission line for the odd mode, and simultaneously, lossless even mode line could be realized.

Although the foregoing prior art devices were indeed substantial advances in state-of-the-art at the time and were furthermore competent for their design application, there remains a continuing need to efficiently integrate certain stripline oriented microwave networks. Millican networks conventionally have a broadside, i.e. parallel/coplanar conductor strips on opposite sides of a dielectric, power divider requirement, and there exists a need to integrate said power divider with the rest of the microwave circuit; i.e. the two broadside conductor strips must be electromagnetically, efficiently joined into a single conductor strip on the substrate face on which the rest of the microwave circuit lies. Prior art broadside stripline devices encountered substantial difficulty in accomplishing such a transition. The invention described in the following disclosure overcomes this unilateral limitation of prior art devices.

SUMMARY OF THE INVENTION

The invention discloses an electrically efficient method for combining two conductor strips on opposite sides of a dielectric substrate in a three substrate layer stripline device into a single conductor on one side of the dielectric substrate. Upper and lower conductors from a common broadside coupled point are diverged and diminished in width before passing one of the conductors through an open slot in the dielectric substrate to be overlapped and soldered to the opposing conductor strip on the opposite side of the dielectric.

OBJECTS OF THE INVENTION

It is therefore a primary object of the invention to efficiently combine two conductor strips on opposite sides of a dielectric substrate in a stripline orientation into a single conductor strip on one side of the dielectric substrate.

A further object of the invention is to provide for a printed circuit (PC) power divider having conductor outputs on opposite sides of a dielectric substrate.

Yet another object of the invention is to provide a method and apparatus for a PC power divider that can be reproduced at low cost, that has a power balance better than 0.1 dB over a set frequency range, that has negligible insertion loss, that has a minimum dB directivity, and that has minimum length for a given degree of match at each of three terminals.

The foregoing and other objects and more advantageous features of the invention will become more readily apparent in view of the attached drawing and description of the preferred embodiment, in light of the appended claims.

BRIEF DESCRIPTION OF THE DRAWING

FIG. 2 is a top view of the coplanar coupled strip 17 of FIG. 1.

DESCRIPTION OF THE PREFERRED EMBODIMENT

Figure 1:
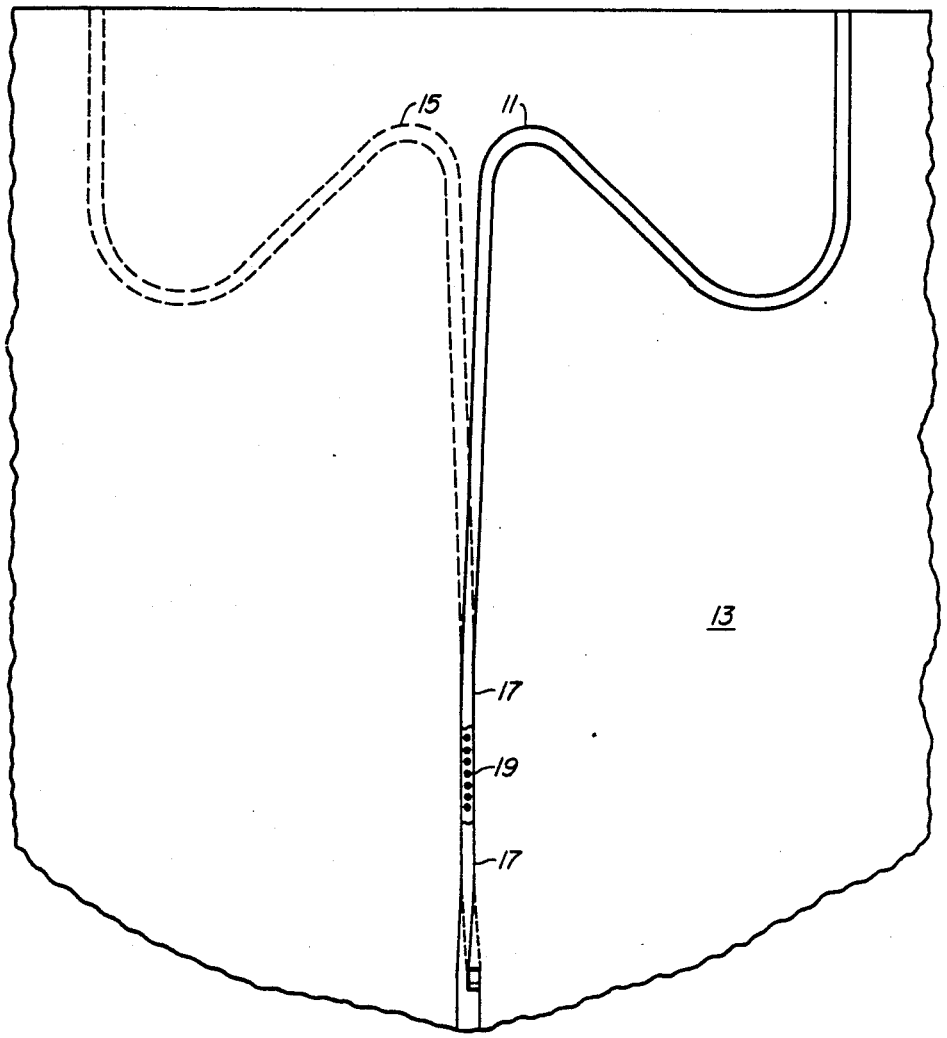
FIG. 1 is a top view of the power divider.
Figure 3B:
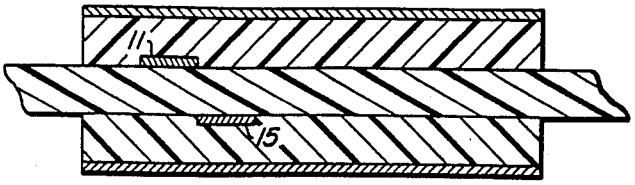
FIG. 3 is a cross section A—A, B—B, C—C, and D—D of FIG. 2.
Figure 3C:
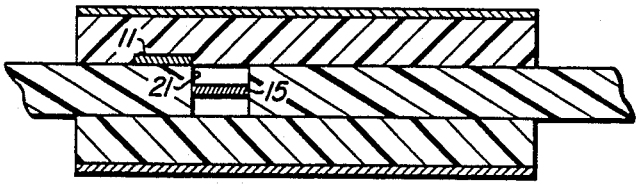
Figure 3D:
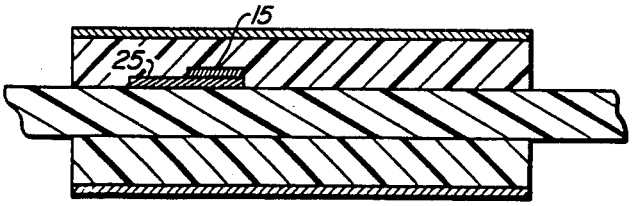
Figure 3E:
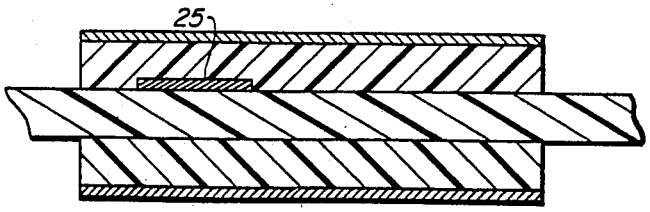

Referring to FIG. 1, a conventional broadside power divider/power combiner described and utilized in prior art typically comprises a first line conductor 11 on one side of a dielectric substrate 13 converging with a second line conductor 15 on the opposite side of the dielectric substrate 13 to yield a broadside/coplanar, dual line conductor 17. A lossy material, as described in U.S. Pat. No. 3,886,498, is conventionally disposed between the conductor lines, 11 and 15, through holes 19 drilled through dielectric substrate 13. Holes 19 are then closed off with conductive material for continuity of dual line conductor 17.

As discussed above, there exists a need to combine dual line conductor leads 17, having broadside leads on opposite sides of dielectric substrate 13, into a single line lead on one side of dielectric substrate 13. The invention provides a means and method for accomplishing this heretofore difficult task as illustrated in FIGS. 2 and 3. FIG. 2 describes a continuation of dual line lead 17 of FIG. 1 which comprises leads 11 and 15, lead 15 being hidden on the opposite side of dielectric substrate 13. To join leads 11 and 15 together on one side of dielectric substrate 13, leads 11 and 15 are both diminished in width while lead 11 is concomitantly diverged to one side of the center line of dual line lead 17 beginning at point A. At points B through D, a hole 21 is cut through dielectric substrate 13, enabling an extension 23 of conductor lead 15 to extend through hole 21 to couple to a single lead 25 comprising the combination of leads 11 and 15 on a single surface of dielectric substrate 13. In one embodiment of the invention where a three layered dielectric sandwich has thicknesses of 0.031/0.010/0.031 inches and a dielectric constant of 2.2, the hole length "l" would be 0.042 inch. The hole width "w" is determined by conventional stripline width requirements.

Referring now to FIG. 3, four consecutive cross sections of the FIG. 2 circuit are provided for convenience in understanding of coupling leads 11 and 15. FIG. 3 describes a typical three-layer stripline configuration for a broadside power divider. A first dielectric substrate 13 is sandwiched between a second and third dielectric substrate, 27 and 29, having first and second ground planes 31 and 33 disposed on opposite sides thereof. Broadside conductor leads 11 and 15 at cross-section A—A are shown diverging and diminishing in size in cross-section B—B. In cross-section C—C conductor lead 15 passes through hole 21 and is joined with conductor lead 11 to form a single conductor lead 25 in cross-section D—D.

Although there has been described hereinabove a particular arrangement of a PC power divider for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A method for coupling two coplanar, broadside conductor strips, separated by a dielectric substrate, into a single conductor strip, comprising the steps of:

diverging an upper and a lower conductor strip from a common broadside coupled point;

diminishing the width of each of said upper and lower diverged conductor strips;

cutting a passageway adjacent said upper diverged conductor strip through said dielectric substrate;

providing an extension to said lower diverged conductor strip;

passing said extension through said passageway in said dielectric substrate; and soldering said extension to a broadened continuation of said upper diverged conductor strip.

2. A printed circuit power divider, comprising:

a first dielectric substrate (DES), having a first and second planar surfaces with at least one hole therethrough;

a second DES, having a first and second planar surfaces, said second planar surface of said second DES being contiguous and coplanar with said first surface of said first DES;

a third DES, having a first and second planar surfaces, said first planar surface of said third DES being contiguous and coplanar with said second surface of said first DES;

a first ground plane covering said first surface of said second DES;

a second ground plane covering said second surface of said third DES;

a first conductor strip etched on said first surface of said first DES converging to a first copolanar point on said first surface of said first DES;

a second conductor strip etched on said second surface of said first DES converging to a second coplanar point on said second surface of said first DES juxtaposed said first copolanar point;

an electrically coupled coplanar extension of said first and second conductor strips extending from said first and second coplanar points;

lossy material disposed at intervals between said first and second conductor strips along said electrically coupled coplanar extension;

an extension of said coplanar first conductor strip extending along one side of said hole;

an extension of said second coplanar conductor strip extending through said hole and soldered to said first conductor strip; and a continuation of said soldered first and second conductor strips on said first surface of said first DES.

* * * * *